March 26, 1963
L. VADEBONCOEUR
3,082,581
SPOOL GRINDING MACHINE
Filed March 29, 1962
3 Sheets-Sheet 2
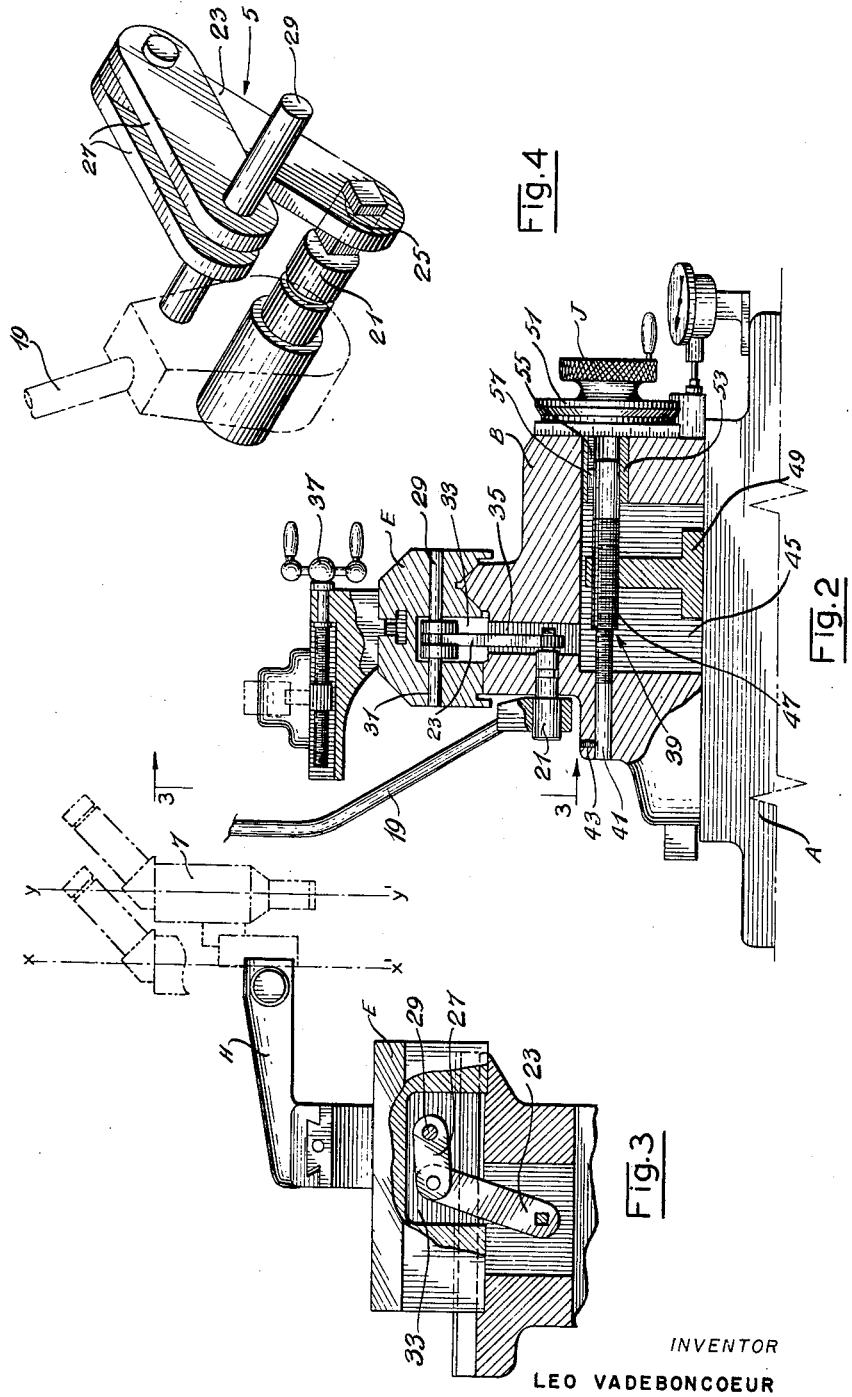
INVENTOR
LEO VADEBONCOEUR
By
Attorneys March 26, 1963  L. VADEBONCOEUR  3,082,581
SPOOL GRINDING MACHINE
Filed March 29, 1962  3 Sheets-Sheet 3
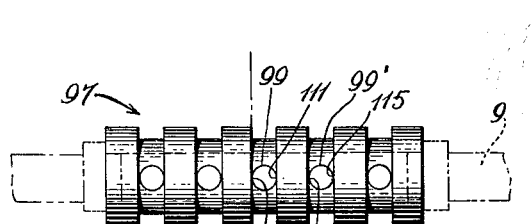
Fig. 5
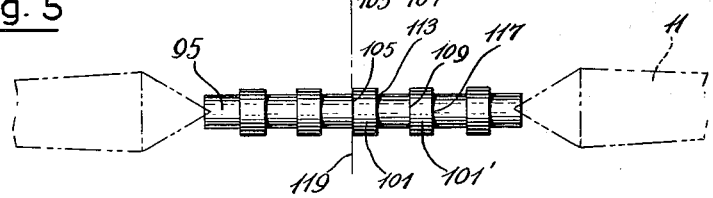
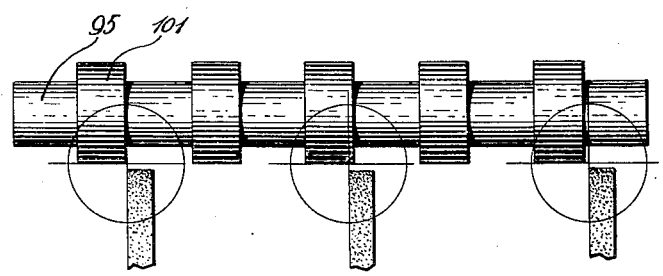
Fig. 6
INVENTOR
LEO VADEBONCOEUR
By
Attorneys United States Patent Office 3,082,581
Patented Mar. 26, 1963

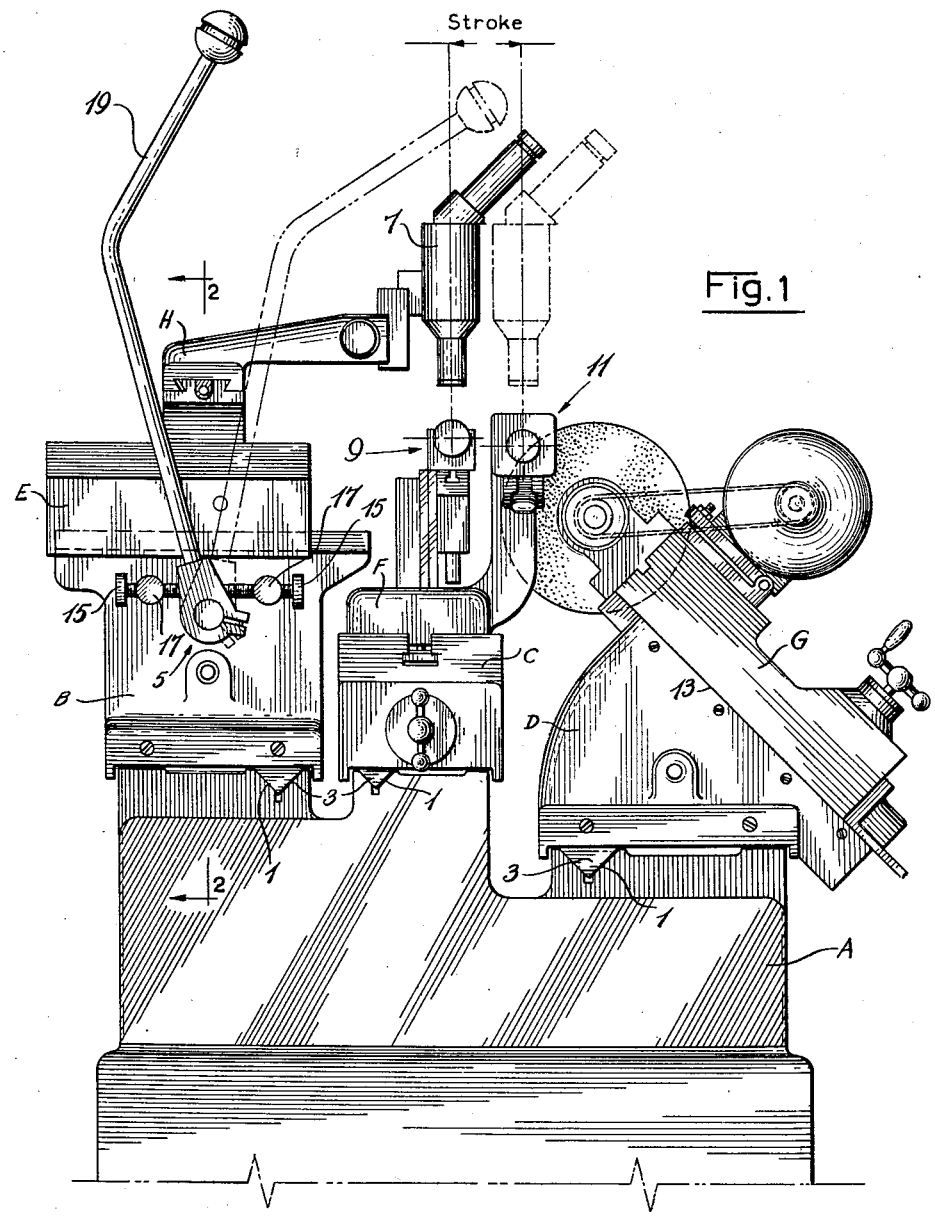

3,082,581
SPOOL GRINDING MACHINE
Leo Vadeboncoeur, Montreal, Quebec, Canada, assignor to Jarry Hydraulics Limited, Montreal, Quebec, Canada
Filed Mar. 29, 1962, Ser. No. 183,502
5 Claims. (Cl. 51—165)

The instant invention pertains to a machine for the precision grinding of mechanical cooperable elements such as the grinding of a spool that is to precisely fit a cooperating sleeve of a valve assembly.

The invention is a general improvement of mechines for such operations as are described in U.S. Patent No. 2,745,222, for instance.

These machines, called microform grinders, are used to manufacture spools for cooperating sleeves of valve assemblies where accuracy in the dimensions between the cooperable elements is of extreme importance, particularly when the valve units are to be used in precision hydraulic equipment, as used in the aircraft industry.

For this purpose, the grinding machine is provided with a movable carrier bed over which are mounted two separate parallel workholders, one fixed and one movable in relation to the bed. A master part or template as well as a spool are held on these workholders, in parallel relationship. The sleeve has a series of ports, axially and circumferentially located thereon. The spool is provided with a plurality of axially spaced lands which are adapted to alternatively close and open the ports of the sleeve by slidably moving in the bore of the latter.

The method of operation contemplates, with the help of associated sighting microscopes, to duplicate on an element, such as the aforementioned spool, the exact distance between two reference points on a template, such as the aforesaid mating sleeve. For instance, it will permit, starting with the first radial shoulder of the land of a spool, to duplicate the exact diametral distance of a sleeve port, on the said land and grind, therefrom, the second radial shoulder of the land. Similarly, it is possible, with this machine, to exactly locate the various lands of a spool so that their spacing corresponds accurately to the spacing of the corresponding ports of a mating sleeve. It is also possible, by suitable adjustment of the microscopes, to have the lands underlap or overlap the corresponding ports.

The invention relates to a spool grinding machine of the aforementioned type and has, as its main object, the provision of such a machine having a single optical structure to adjust the alignments of the corresponding ports on the template and on the piece to be ground. Apart from being more rapid and convenient, the single optics provision will ensure, as is obvious, greater freedom from maladjustments as only a single microscope is involved.

Other secondary objects lie in the provision of differential screw feeds on the microscope carrier bed and the grinding wheel carrier bed, thus providing a much greater sensitivity and accuracy in carrying out the relative adjustments of the template and spool and also in the actual grinding of the spool lands.

Generally, these objects are attained by the provision of a spool grinding machine comprising: a body; a rear and an intermediate carrier mounted on said body for parallel longitudinal displacement thereon; a master holder and a workholder disposed one behind the other in parallel transversely spaced relationship on said intermediate carrier; a microscope transversely movable for selectively sighting reference points on the master and work of the respective masterholder and workholder; a carrier for said microscope transversely displaceable on said rear carrier; a leverage assembly operatively connecting said rear and microscope carriers to move the microscope between the work and master.

Other objects and advantages of the invention will become apparent as the following description proceeds, having regard to the accompanying drawings; wherein:

FIG. 1 is a side elevation view of the complete spool grinding machine;

FIG. 2 is a transverse cross sectional view, showing the microscope carrier bed displacing mechanism, taken along line 2—2 of FIG. 1;

FIG. 3 illustrates a side elevation view, partly broken away, intended to show a side longitudinal view of the microscope carrier bed;

FIG. 4 gives, in exploded perspective, the parts arrangement of the mechanism of FIGS. 2 and 3;

FIG. 5 is a plan view of a pair of elements, shown to illustrate the mode of operation, while;

FIG. 6 is an enlarged plan view of the spool having, superimposed thereon, the crosshairs of the microscope in different locations.

FIG. 1 shows the invention as being made of three independent carriers, mounted on body A and longitudinally movable on the machine, i.e. perpendicularly to the plane of the paper. All three carriers, B, C, and D move in parallel paths and are guided in V-shaped grooves 1 on body A into which slidably fit downward V-shaped projections 3, one on each carrier.

Both rear carrier B and front carrier D are provided with differential screws permitting accurate adjustments of the respective carriers. One such differential screw feed is shown in greater detail in FIG. 2 and will be described later. These screws allow, on the one hand, precise transferring of lengths from the master to the workpiece and on the other hand, precise positioning of the grinding wheel, which position must be, of course, as exact as the transfer of lengths by the microscope.

Movable transversely of rear carrier B and on top thereof, is the microscope bed E. By means of a leverage assembly 5, the objects of FIGS. 2, 3 and 4, this bed may be moved back and forth to bring microscope 7 in sighting position with either of the master or the forwardly located workpiece. The microscope itself rests on a slide H that may be given limited longitudinal adjustment by means of screw and handle arrangement 37 (FIG. 2).

Sitting on intermediate carrier C and equally longitudinally displaceable is a work bed F which carries the master assembly 9 and, forwardly thereof, the workpiece assembly 11. It should be carefully noted that while master assembly 9 is longitudinally movable in respect to work bed F, workpiece assembly is fixed thereto for a purpose to be explained later.

Finally, the front carrier D is provided with an inclined upper surface 13 aadpted to slidably receive a grinding wheel assembly G, movable on an incline to bring the grinding wheel onto, or retract it from the workpiece.

As mentioned previously, one object of the invention lies in the provision of a single optic. This is obtained by means of the arrangement shown in FIGS. 2, 3 and 4. By the provision of this arrangement, it is possible to move telescope 7 from one axial line XX' to a second axial line YY' as shown in FIG. 3. The distance between two extreme positions (the "stroke" in FIG. 1) is adjustable by means of two stop screws 15 rotatable through threaded bores of projections 17 integral with rear carrier B and controlling the deflection of lever 19.

Control lever 19 is fixed to one end of a shaft 21, journaled on a bore through rear carrier B. The other end of shaft 21 is secured to a crank 23 which is part of leverage assembly 5. This may be obtained by the arrangement of FIG. 4 where the end of shaft 21 is shown square and non-rotatably fits into a corresponding square aperture 25 through crank 23. Finally crank 23 is pivotally joined to two links 27, one on either side thereof; said links being mounted on an operating rod 29 which extends through a bore 31 of microscope carrier E. It will be understood that links 27 may be fixed to rod 29 which, in turn, would pivot into bore 31, or vice-versa.

Assembly 5 is housed within suitable recesses or housings 33 and 35 in microscope carrier E and rear carrier B respectively.

Longitudinal displacement of rear carrier B is obtained by means of a differential screw mechanism 39. This feeding mechanism features a high ration hand-wheel to linear displacement. It is achieved by the use of two screws of different pitches but of same handling. A first screw 41, mounted on the lower portion of rear carrier B is fixed thereto by any means such as set screw 43. This first screw extends into a housing 45 and into a cylindrical second screw 47 threaded both internally and externally. The threads of first screw 41 engage those internal threads of second screw 47. The external threads of screw 47, in turn, fit the internally threaded nut block 49. This nut block is fastened onto body A of the machine.

The actuating mechanism comprises a knurled handwheel J integral with a graduated wheel 51. Fixed to this handwheel and axially thereof, is a handwheel shaft or sleeve 53 provided with a longitudinal inner slot 55 for the reception of a key 57 mounted on the end of second screw 47. Sleeve 55 is rotatable in a suitable aperture through a wall of rear carrier B and is non-axially movable.

Clockwise rotation of handwheel shaft 53, and hence of screw 47, results in the leftward travel of the screw. At the same time, screw 41, and hence carrier B, travels to the right.

The leftward travel is proportional to the pitch screw 47 whereas the rightward travel is proportional to the pitch of screw 41. The resulant travel of carrier B for one revolution of handwheel 53 is, therefore, the difference between the pitches of the two threads. It will thus be seen that this differential screw arrangement can be made to provide minute displacements and accurate adjustments of the microscope.

FIGS. 5 and 6 illustrate how the apparatus can be used in the manufacture of a spool or piston 95 intended to slide into the bore of a sleeve 97, which is here used as a master. Sleeve or master 97 is provided with a plurality of axially spaced ports 99, 99' while piston or spool 95 is formed with a series of lands 101, 101' adapted to cooperate to close the ports of the cylinder. Each valve assembly is manufactured as a unit and spool 95 is adapted to cooperate with a particular sleeve 97 which is used as a template.

In valve assemblies of this type, it may be extremely important, for instance, that the distance between a tangential point 103, of one port 99, and a second tangential point 107, of another port 99', be precisely equal to the distance between edge 105, of land 101, and edge 109, of land 101', so that when spool 95 is used in sleeve 97, the ports 99, 99' be covered and uncovered simultaneously.

To obtain this result the following method is used. Spool 95 and master 97 are mounted on workholder 11 and masterholder 9 respectively. While workholder 11 is fixed to intermediate carrier C (FIG. 1), masterholder 9 may longitudinally move thereon.

Microscope 7 is brought over spool 95 and intermediate carrier C longitudinally displaced so as to bring hairline 119 in alignment with an edge 105, already made. Microscope 7 is then brought over master 97 and masterholder 9 is moved longitudinally, without displacement of intermediate carrier C and thus workholder 11, until hairline 119 coincides with point 103 of port 99. When this is obtained the situation is that of FIG. 5 with the hairline in registry with both edge 105 and corresponding point 103. From there, intermediate carrier may move, both the workholder 11 and masterholder 9 until hairline 119 coincides with point 107 of port 99'. The operator may then adjust the grinding wheel to produce edge 109 of land 101', with the help of microscope 7 now moved over to spool 95.

Afterwards, the distance between port points 111, 115, may accurately be duplicated between land edges 113, 117. In those cases, the situation on the grinding wheel is similar to that shown at I on FIG. 6.

In some instances, it may be desirable to machine the spool lands, so that they overlap or underlap the ports of the sleeve by a predetermined amount. In such instances, the microscope has to be adjusted to obtain the desired amount of overlap or underlap; situations similar to those shown at II or III of FIG. 6. Precise adjustments of the microscope for the purpose is obtained by the use of the differential screw assembly described in conjunction with FIG. 2.

I claim:

1. A spool grinding machine comprising: a body; a front, a rear and an intermediate carrier mounted on said body for independent parallel longitudinal displacement thereon; a masterholder and a workholder for holding a master and a workpiece respectively and disposed one behind the other in parallel transversely spaced relationship on said intermediate carrier; a microscope transversely movable for selectively sighting reference points on the master and workpiece of the respective masterholder and workholder; a carrier for said microscope transversely displaceable on said rear carrier; a leverage assembly operatively connecting said rear and microscope carriers to move the microscope between the workpiece and master; a grinding wheel device being mounted on said front carrier.

2. A spool grinding machine comprising: a body; a front, a rear and an intermediate carrier mounted on said body for independent parallel longitudinal displacement thereon; a masterholder and a workholder for holding a master and a workpiece respectively and disposed one behind the other in parallel transversely spaced relationship on said intermediate carrier; a microscope transversely movable for selectively sighting reference points on the master and workpiece of the respective masterholder and workholder; a carrier for said microscope transversely displaceable on said rear carrier; a leverage assembly operatively connecting said rear and microscope carriers to move said microscope between said master and said workpiece and comprising: communicating chambers in said rear and microscope carriers; a longitudinal shaft in the rear carrier chamber and a parallel longitudinal rod in the microscope carrier chamber; leverage means operatively connecting said shaft and rod; an actuating lever fixed to said shaft so that pivoting of the latter will transversely move the microscope carrier through the action of the leverage means and rod; a grinding wheel device being mounted on said front carrier for transverse displacement thereon.

3. A spool grinding machine comprising: a body; a front, a rear and an intermediate carrier mounted on said body for independent parallel longitudinal displacement thereon; a masterholder and a workholder for holding a master and a workpiece respectively and disposed one behind the other in parallel transversely spaced relationship on said intermediate carrier; a microscope transversely movable for selectively sighting reference points on the master and workpiece of the respective masterholder and workholder; a carrier for said microscope transversely displaceable on said rear carrier; a leverage assembly operatively connecting said rear and microscope carriers to move said microscope between said master and said workpiece and comprising: communicating chambers in said rear and microscope carriers; a longitudinal shaft in the rear carrier chamber and a parallel longitudinal rod in the microscope carrier chamber; leverage means operatively connecting said shaft and rod; one end of said shaft extending through the wall of said rear carrier chamber; an actuating lever fixed to said shaft so that pivoting of the latter will transversely move the microscope carrier through the action of said leverage means and rod; a transversely displaceable grinding wheel device being mounted on said front carrier.

4. A spool grinding machine comprising: a body; a front, a rear and an intermediate carrier mounted on said body for independent parallel longitudinal displacement thereon; a masterholder and a workholder for holding a master and a workpiece respectively and disposed one behind the other in parallel transversely spaced relationship on said intermediate carrier; a microscope transversely movable for selectively sighting reference points on the master and workpiece of the respective masterholder and workholder; a carrier for said microscope transversely displaceable on said rear carrier; a leverage assembly operatively connecting said rear and microscope carriers to move said microscope between said master and said workpiece and comprising: communicating chambers in said rear and microscope carriers; a longitudinal shaft in the rear carrier chamber and a parallel longitudinal rod in the microscope carrier chamber, leverage means operatively connecting said shaft and rod; one end of said shaft extending through the wall of said rear carrier chamber; an actuating lever fixed to said shaft so that pivoting of the latter will transversely move the microscope carrier through the action of said leverage means and rod; and adjustable abutting means on the outer wall of said rear carrier and on either sides of said lever for limiting the pivoting movement of said lever and shaft; a grinding wheel device being mounted on said front carrier for inclined transverse displacement thereon.

5. A machine as claimed in claim 4 being further provided with differential screw means between said rear carrier and body permitting precise longitudinal displacement of the said rear carrier.

References Cited in the file of this patent
UNITED STATES PATENTS

| | | |
|---|---|---|
| 2,745,222 | Charf et al. | May 15, 1956 |
| 2,986,855 | Beydler | June 6, 1961 |